United States Patent
Vijayasankar et al.

(10) Patent No.: US 11,818,048 B2
(45) Date of Patent: Nov. 14, 2023

(54) NETWORK DEVICES IN DUTY CYCLE LIMITED NETWORKS

(71) Applicant: TEXAS INSTRUMENTS INCORPORATED, Dallas, TX (US)

(72) Inventors: Kumaran Vijayasankar, Allen, TX (US); Suyash Jain, Irving, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 48 days.

(21) Appl. No.: 17/239,244

(22) Filed: Apr. 23, 2021

(65) Prior Publication Data

US 2021/0336886 A1  Oct. 28, 2021

Related U.S. Application Data

(60) Provisional application No. 63/015,169, filed on Apr. 24, 2020.

(51) Int. Cl.
*H04L 47/127* (2022.01)
*H04L 43/0882* (2022.01)

(52) U.S. Cl.
CPC ........ *H04L 47/127* (2013.01); *H04L 43/0882* (2013.01)

(58) Field of Classification Search
CPC ............... H04L 47/127; H04L 43/0882; H04L 41/0816; H04L 43/065; H04L 41/147; H04L 41/149; H04L 41/16; H04L 47/762; H04L 41/0896
See application file for complete search history.

(56) References Cited

U.S. PATENT DOCUMENTS

| | | | | |
|---|---|---|---|---|
| 8,160,096 | B1* | 4/2012 | Anburaj | H04J 3/1605 370/255 |
| 2012/0281529 | A1* | 11/2012 | Singamsetty | H04L 45/302 370/230 |
| 2012/0327770 | A1* | 12/2012 | Vijayasankar | H04L 47/12 370/235 |
| 2015/0333953 | A1* | 11/2015 | Vasseur | H04L 45/22 370/228 |
| 2018/0013635 | A1* | 1/2018 | Acharya | H04L 67/303 |

* cited by examiner

*Primary Examiner* — Will W Lin
(74) *Attorney, Agent, or Firm* — Mandy Barsilai Fernandez; Frank D. Cimino

(57) ABSTRACT

Aspects of the disclosure provide for a computer program product comprising computer executable instructions. The instructions are executable by a controller of a network device to cause the controller to analyze data transmitted by the network device via a network for a programmed amount of time, determine a data transmission pattern based on the analysis, determine, based on the transmission pattern, a volume of expected data transmission during a period of time, and determine whether to transmit additional data based on a relationship between the volume of expected data transmission during the period of time and a bandwidth allocation of the network device during the period of time.

20 Claims, 3 Drawing Sheets

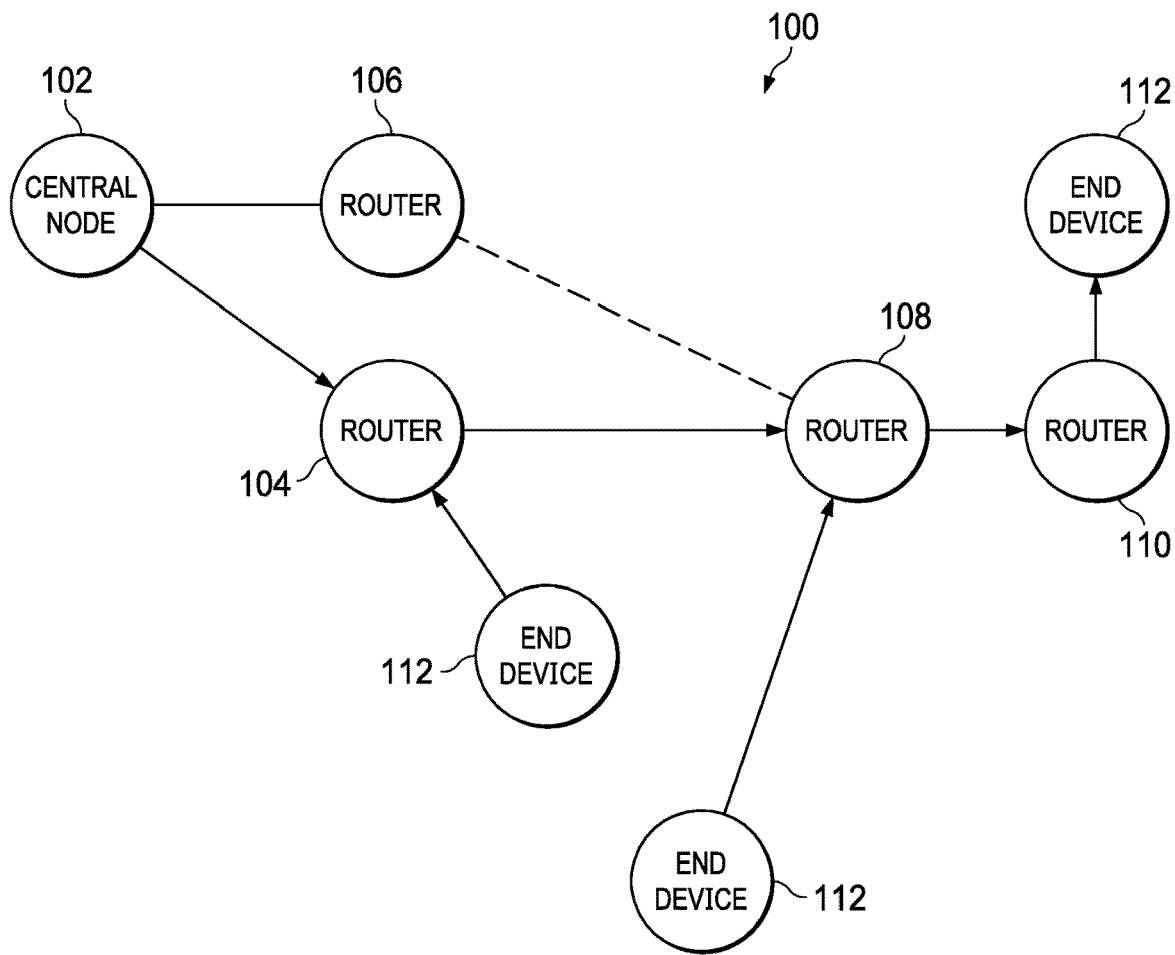
FIG. 1
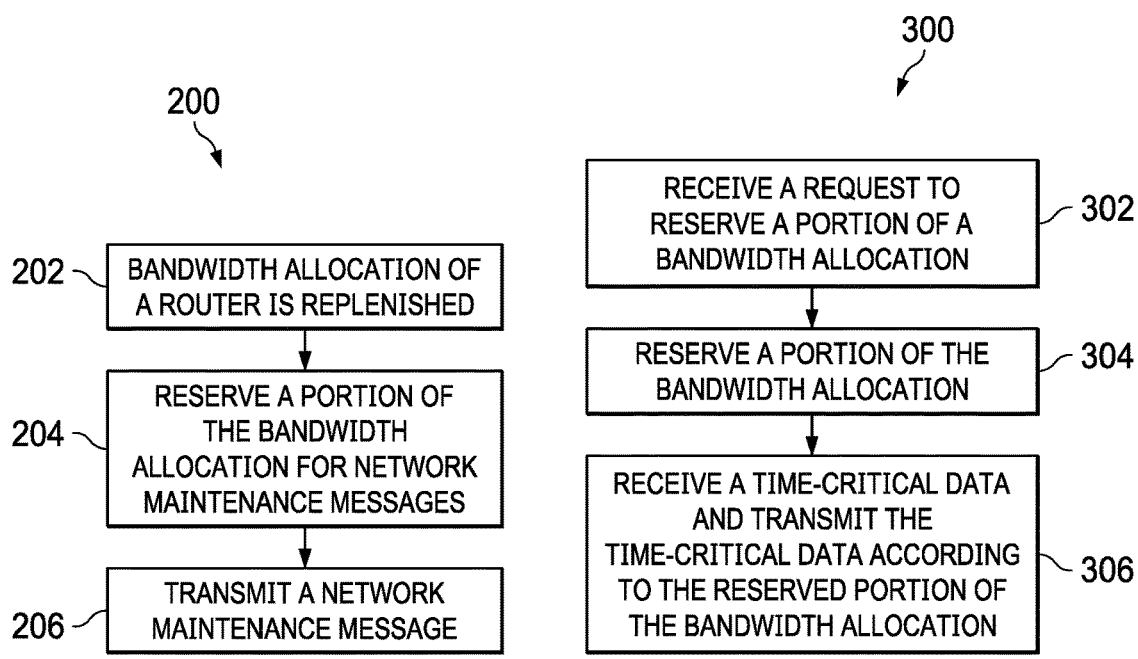
FIG. 2
FIG. 3

NETWORK DEVICES IN DUTY CYCLE LIMITED NETWORKS

CROSS-REFERENCE TO RELATED APPLICATIONS

The present application claims priority to U.S. Provisional Patent Application No. 63/015,169, which was filed Apr. 24, 2020, is titled "Network Optimization In Duty Cycle Limited Networks," and is hereby incorporated herein by reference in its entirety.

SUMMARY

Aspects of the disclosure provide for a computer program product comprising computer executable instructions. The instructions are executable by a controller of a network device to cause the controller to analyze data transmitted by the network device via a network for a programmed amount of time, determine a data transmission pattern based on the analysis, determine, based on the transmission pattern, a volume of expected data transmission during a period of time, and determine whether to transmit additional data based on a relationship between the volume of expected data transmission during the period of time and a bandwidth allocation of the network device during the period of time.

Other aspects of the disclosure provide for a computer program product comprising computer executable instructions. The instructions are executable by a controller of a network device to cause the controller to determine a portion of a bandwidth allocation of the network device during a period of time consumed at a point in time within an instance of the period of time, responsive to the consumed portion of the bandwidth allocation being greater than a threshold amount, generate a status notification indicating the consumed portion of the bandwidth allocation, and transmit the status notification to a second network device.

Other aspects of the disclosure provide for a computer program product comprising computer executable instructions. The instructions are executable by a controller of a network device to cause the controller to receive a request to reserve a portion of a bandwidth allocation of the network device for transmission of first network data, reserve the portion of the bandwidth allocation of the network device for transmission for first network data, and transmit, to a second network device based on the request to reserve the portion of the bandwidth allocation of the network device, a request to reserve a portion of a bandwidth allocation of the second network device.

BRIEF DESCRIPTION OF THE DRAWINGS

For a detailed description of various examples, reference will now be made to the accompanying drawings in which:

FIG. 1 shows a block diagram of an example network.
FIG. 2 shows a flowchart of an example method.
FIG. 3 shows a flowchart of an example method.

DETAILED DESCRIPTION

Figure 4:
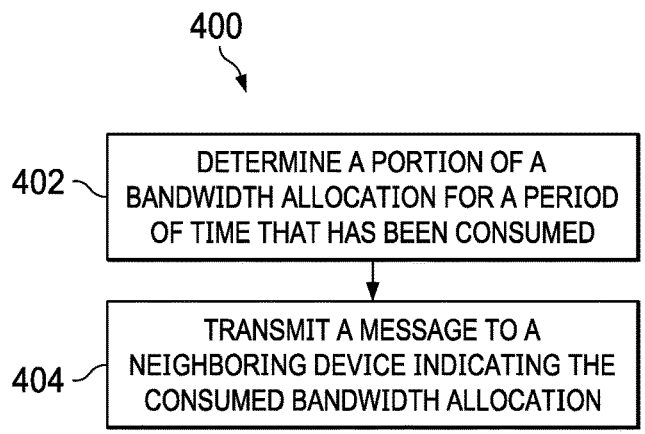
FIG. 4 shows a flowchart of an example method.

Some networks are subject to duty cycle limitations, requirements, or regulations. Accordingly, devices that operate in such networks may also be subject to certain operational limitations that may be artificially imposed, such as resulting from government regulation. The artificially imposed limitations may be limitations that are not related to architectural, processing, or other physical limitations of the devices themselves, but instead by intentional limiting of the capabilities of the devices, such as through software in a modifiable manner, to comply with the government regulation. For example, some regulatory bodies may impose duty cycle limitations on networks, and therefore on network devices operating within those networks. The duty cycle limitations may limit a transmission time of a given network device to a maximum transmission time over a given period of time. For example, one regulation may limit a maximum transmission time of a network device subject to the regulation to about 90-100 seconds (s) per 3600 s period. Other various regulations may impose other maximum transmission time limits over other periods of time, and the particular maximum transmission time or the particular period of time over which the maximum transmission time applies is not limited by the present disclosure.

These duty cycle limitations may result in a bandwidth allocation for each network device subject to the duty cycle limitations, where that bandwidth allocation is represented as a number of seconds (or time units less than seconds, such as milliseconds, etc.) for which the network device may transmit per specified period of time. After the network device has exhausted its bandwidth allocation, the network device may be prohibited from transmitting further data until expiration of the period of time and beginning of a new period of time for which the bandwidth allocation of the network device is replenished, such as to its maximum transmission time limit for the period of time.

However, these duty cycle limitations can create networking challenges. The challenges may be particularly evident in mesh networks. In a mesh network, a network discovery operation may result in network devices in the network learning and storing transmission routes. The transmission routes may dictate a path that data takes through the mesh network. For example, when a first network device transmits a packet in the network, a header, frame, or other data structure of the packet may be programmed with data such that a second device receiving the packet is instructed to which other network device(s) the packet is to be transmitted. This may repeat for each network device receiving the packet until the packet reaches its destination, or delivery fails for reasons outside the scope of this disclosure. When the first network device transmits the packet to the second network device, it is assumed that the second network device will transmit the packet to the next network device along the programmed transmission route in a timely manner. However, if the second network device has exhausted its bandwidth allocation, the second network device is prohibited from transmitting the packet until the beginning of a next period of time.

Similarly, the second network device is prohibited from transmitting a message to the first network device indicating that it is unable to transmit the packet until the beginning of the next period of time. Were the first network device informed of, or otherwise aware of, the inability of the second network device to transmit the packet, the first network device may be capable of transmitting the packet to its destination in a more timely manner through another transmission route that avoids the second network device, thereby mitigating delay in providing the packet to its destination due to the exhaustion of the bandwidth allocation of the second network device. In addition, the second network device may be prohibited from sending link state messages to neighboring network devices in the network. In at least some networks, a neighboring network device (such as the first network device) may initiate a network discovery operation to determine a new route through the network responsive to not having received a link state message from the second network device in a particular window of time. The network discovery operation may unnecessarily consume portions of the bandwidth allocations of the neighboring network devices, unnecessarily consume power, increase delay in forwarding packets through the network, etc.

Aspects of the disclosure provide for a network device that mitigates at least some adverse effects of duty cycle limitations on the network device. At least some of the mitigating actions performed by the network device may mitigate adverse effects of the duty cycle limitations on neighboring network devices. In this way, mitigating actions performed by the network device may improve operation of the neighboring network devices and/or overall operation of the network in which the network device operates, such as by reducing bandwidth consumed in the network to perform network discovery operations resulting from neighboring network devices being unaware that the network device has exhausted its bandwidth allocation. Other improvements include increasing timeliness of transmission of data through the network and/or reserving bandwidth for time-sensitive data or network maintenance data, each as further described elsewhere herein.

Multiple examples of this disclosure may provide the above improvements to network devices. In an example, a network device may predict a data transmission pattern for the network device based on past, or historical, records of data transmission by the network device. Based on the data transmission pattern, the network device may ration or otherwise manage its usage of its bandwidth allocation. For example, the network device may subdivide the period of time and its bandwidth allocation, limiting its transmissions to only a portion of the bandwidth allocation for a corresponding portion of the period of time. This may provide for the network device reaching a last portion of the period of time with at least some of the bandwidth allocation remaining. The network device may also refuse certain data transmission requests. For example, if the network device receives a request to transmit data that has a size that is greater than a threshold amount of the bandwidth allocation of the network device, or a remaining bandwidth allocation of the network device, or a threshold percentage greater in size than data expected by the network device in a particular window of time, the network device may decline to transmit the data. In such an example, the network device may inform a requesting network device, or application, of its refusal such that the requesting device, or application, has an opportunity to seek an alternative route for transmitting the data.

In another example, the network device may prioritize certain data. For example, at the beginning of a period of time in which the network device receives a bandwidth allocation, the network device may reserve or allocate a portion of the bandwidth allocation for certain data. The certain data may be, for example, network maintenance messages. The network maintenance messages (such as link state or link status messages) may be data that originates with the network device or may be data that is received by the network device with an expectation that the network device will then transmit the data to further disseminate the data through the network to other network devices. By reserving the portion of the bandwidth allocation for network maintenance messages, the network device may retain bandwidth for informing neighboring devices of its availability in the network, for example, to prevent unnecessary network discovery operations, as discussed above.

In addition, by reserving the portion of the bandwidth allocation for network maintenance messages, the network device may retain bandwidth for informing neighboring devices of its near exhaustion of its bandwidth allocation. For example, the network device may maintain a record of an amount of data transmitted by the network device during the period of time. Periodically, such as at a periodicity specified by a communication protocol according to which the network device operates, a network policy of the network device, etc., the network device may transmit a link status message to neighboring network devices. The link status message may include received, or determined, information about at least some of the neighboring network devices. The link status message may also include information of the network device. For example, the link status message may include an indication of an amount of bandwidth consumed by the network device during a current period of time, an amount of a bandwidth allocation of the network device remaining for the period of time, an amount of time remaining in the period of time, an amount of time until a new bandwidth allocation is received (e.g., the bandwidth allocation of the network device is replenished), and/or any combinations thereof.

Additionally, or alternatively, the network device may transmit the link status message, or a link status message including information of the network device but not including information of neighboring network devices, responsive to the amount of data transmitted by the network device during the period of time exceeding a threshold. For example, the network device may transmit the link status message responsive to 50 percent of its bandwidth allocation being exhausted, 75 percent of its bandwidth allocation being exhausted, 90 percent of its bandwidth allocation being exhausted, all of its bandwidth allocation not reserved or allocated for other purposes being exhausted, a percentage of its bandwidth allocation not reserved or allocated for other purposes being exhausted, or any other suitable triggering event. In this way, neighboring network devices may be aware of limitations of the network device with respect to the bandwidth allocation of the network device (e.g., such as a remaining portion of the bandwidth allocation of the network device), thereby modifying their operation to improve performance of the network in view of the remaining portion of the bandwidth allocation of the network device.

While discussed above in the context of actions performed in an example in which the network device reserves the portion of the bandwidth allocation for network maintenance messages, the network device may also provide the bandwidth exhaustion notifications, as long as a sufficient amount of the bandwidth allocation remains, in examples which do not reserve the portion of the bandwidth allocation for network maintenance messages.

In another example, the network device may reserve a portion of its bandwidth allocation for time-sensitive data. For example, the network device may receive a notification from a device indicating that the device expects or intends to transmit time-sensitive data. Responsive to receipt of the notification, the network device may reserve a portion of its bandwidth allocation for a period of time corresponding to expected receipt of the time-sensitive data and a size of the time-sensitive data indicated in the request. In some examples, the network device may also reserve a buffer of time in addition to the size of the time-sensitive data indicated in the request. In some examples, the buffer size may be indicated in the request, while in other examples the buffer size may be determined by the network device either independent of, or based on, the size of the time-sensitive data indicated in the request. In at least some examples, the network device may reserve a portion of its bandwidth allocation in multiple periods of time based on the request. In at least some examples, the network device may also transmit the request, or another request including at least some of the information included in the request, to a neighboring network device such that each neighboring network device along a full transmission path of the time-sensitive data has reserved portions of their respective bandwidth allocations to account for transmitting the time-sensitive data. In at least some examples, the time-sensitive data may be flagged, such as in a header or control portion of a data packet or frame, with an indicator that it is time-sensitive data to inform each network device that the reserved portion of bandwidth allocation should be used for transmitting the time-sensitive data.

Each of the notifications may be provided in existing or newly added data elements of data transmissions, such as in an Information Element of a data frame. For example, at least some of the notifications described herein may be included in a frame control field of a header of a data frame. At least some of the notifications described herein may be included in a payload of a data frame, such as a command payload that includes a link status list that includes link status or link state messages, as described herein.

FIG. 1 shows a block diagram of a network 100. The network 100 may be representative of any suitable networking environment, the scope of which is not limited herein. In an example, the network 100 includes a central node 102, a router 104, a router 106, a router 108, a router 110, and end devices 112. The central node 102 may be a device that functions as a gateway to another network outside the network 100, a control point, or some other central point to which each router 104-110 in the network 100 ultimately communicates and routes data. Each router of the routers 104, 106, 108, and 110 may be a device capable of receiving and forwarding data, such as in the form of packets and/or frames, to other devices. The end devices 112 may be devices that communicate with the routers 104-110 and are capable of both receiving and transmitting data, but are not capable of forwarding packets received from the routers 104-110 to other devices. In at least some networks, such as mesh networks, a router (e.g., any of the router 104-110) may be referred to as a node or more generically as a network device, such as is described herein. Similarly, in at least some examples, the central node 102 and/or the end device(s) 112 may be referred to more generically as a network device, such as is described herein. Although only some end devices 112 are shown, in various examples the network 100 may include any number of end devices 112, any number of end devices 112 may be in communication with any one of the routers 104-110, and a particular end device 112 may be in communication with multiple of the routers 104-110. Similarly, while the network 100 shows four routers, any number of routers may be included, the scope of which is not limited herein. Additionally, in at least some examples, at least some of the central node 102 and/or the routers 104-110 are devices that operate at least partially according to ZIGBEE specification, as provided by the ZIGBEE Alliance and based on Institute of Electrical and Electronics Engineers (IEEE) standard 802.15.4. In other examples, at least some of the central node 102 and/or the routers 104-110 are devices that operate, or are capable of or suitable for operating, at least partially according to any other one or more standards or specification.

In an example of operation, a network discovery operation may be performed in the network 100 to identify routes within the network 100. For example, each of the routers 104-110 may determine and store a route map or route tree that describes paths through the network that may be utilized by the respective router 104-110 for transmitting data to the central node 102. For example, the router 110 may discover and store two routes for transmitting data to the central node 102. A first through the router 108 and the router 104 to the central node 102 and a second through the router 108 and the router 106 to the central node 102. This may be described as 110>108>104>102 or 110>108>106>102, respectively. Similarly, the router 108 may discover and store two routes for transmitting data to the central node 102. The routes may be 108>104>102 and 108>106>102. The router 106 may discover and store two routes for transmitting data to the central node 102. The routes may be 106>102 and 106>108>104>102. The router 104 may discover and store two routes for transmitting data to the central node 102. The routes may be 104>102 and 104>108>106>102. As can be seen from the above routes, if the router 108 becomes incapable of transmitting data, the router 110, and any end device 112 communicatively coupled to the router 110 but not another router of the routers 104-110, is effectively cut off from the central node 102, irrespective of a capability of the router 110 to transmit data. Similarly, any end device 112 communicatively coupled to the router 108 but not another router of the routers 104-110 is also effectively cut off from the central node 102. However, if instead the router 104 becomes incapable of transmitting data, the router 108 and the central node 102 may bypass the router 104 and instead transmit data through the router 106, if the router 108 and/or the central node 102 become aware of such inability of the router 104 to transmit data.

As described above, in at least some examples, duty-cycle limitations may be imposed on transmissions of at least some of the devices of the network 100. For example, the router 104 may have a bandwidth allocation for a period of time, and the router 104 may be prohibited from transmitting data, regardless of the content, purpose, or destination of the data, for a remainder of that period of time after that bandwidth allocation is exhausted and until the bandwidth allocation is replenished at the beginning of (or during) a next period of time. If the router 104 exhausts its bandwidth allocation without informing its neighboring devices, such as the central node 102 and/or the router 108, the router 104 may appear to the central node 102 and/or the router 108 as being offline. The router 104 appearing offline to the central node 102 and/or the router 108 may cause the central node 102 and/or the router 108 to initiate a network discovery operation to identify new routes through the network 100, such as through the router 106. The network discovery operation may consume portions of respective bandwidth allocations of the central node 102 and the router 108, may delay transmission of payload data though the network 100, may consume additional power in operation of components of the network 100, etc. Such costs of the network discovery operation may be unnecessary because the router 104 is not offline, but instead has merely exhausted its bandwidth allocation and is therefore unable to communicate with the central node 102 and/or the router 108 until the beginning of a next period of time and replenishment of its bandwidth allocation.

In at least some examples, the router 104 may monitor and/or measure its duty cycle over the period of time and, based on a comparison of that duty cycle to a maximum duty cycle over the period of time, or other threshold amount of the maximum duty cycle over the period of time, may provide a notification to neighboring devices. The neighboring devices may be the central node 102 and the router 106. In some examples, the neighboring devices may also include the router 106 and the router 110. Based on the notification, one or more of the central node 102, the router 106, the router 108, and/or the router 110 may modify their operation. For example, the notification may be a link status message that indicates a portion of the maximum duty cycle over the period of time used by the router 104 to the point in time at which the notification is transmitted. In other examples, the notification may include an amount of time until, or a time at which, the bandwidth allocation of the router 104 is expected to be replenished. In other examples, the notification may include a reference to a programmed threshold level, where receiving devices such as the central node 102 and/or the router 108 are programmed to have an understanding of the meaning of the reference to the programmed threshold level.

In at least some examples, mitigation action taken by the central node 102 and/or the router 108 (or other devices, such as the router 106 and/or the router 110), collectively "other devices in the network 100" may be determined according to the content of the notification message. For example, if the duty cycle used by the router 104 is less than a first threshold, the other devices in the network 100 may continue operation as normal, unless their own respective used duty cycles dictate modified operation. In some examples, the duty cycle used by the router 104 being less than the first threshold may be indicated in the notification as a "normal" status reference. If the duty cycle used by the router 104 is greater than or equal to the first threshold, but less than a second threshold, the other devices in the network 100 may modify their operation. For example, the other devices in the network 100 that utilize the router 104 in their transmission path(s) may cease certain increased-bandwidth operations, such as over-the-air downloads (OADs), to limit bandwidth consumption of the router 108. In some examples, the duty cycle used by the router 104 being greater than or equal to the first threshold, but less than the second threshold, may be indicated in the notification as "limited" status reference. If the duty cycle used by the router 104 is greater than or equal to the second threshold, but less than a third threshold, the other devices in the network 100 may modify, or further modify, their operation. For example, the other devices in the network 100 that utilize the router 104 in their transmission path(s) may cease additional operations, such as non-critical or non time-sensitive operations, to limit bandwidth consumption of the router 104. In some examples, the duty cycle used by the router 104 being greater than or equal to the second threshold, but less than the third threshold, may be indicated in the notification as "critical" status reference. If the duty cycle used by the router 104 is greater than or equal to a fourth threshold, the other devices in the network 100 may cease to transmit data frames to the router 104 for further transmission or forwarding. In some examples, the duty cycle used by the router 104 being greater than or equal to the fourth threshold, may be indicated in the notification as "suspended" status reference. In at least some examples, other devices in the network 100 that utilize the router 104 in their transmission path(s) may cease transmission of data frames to the router 104 for further transmission or forwarding until the other devices in the network 100 receive a notification from the router 104 including a status reference having a value other than "suspended." In at least some other examples, the router 104 may include other, or additional, data in the notification. For example, the router 104 may indicate an expected time at which its bandwidth allocation is to be replenished, an expected amount of time until its bandwidth allocation is to be replenished, etc.

Based on the status references of normal, limited, critical, or suspended (or other functionally equivalent notifications), at least some of the other devices in the network 100 may modify their operation. For example, at least some of the other devices in the network 100 may reduce an amount of data sent to the router 104 for forwarding, may cease transmitting data to the router 104 for forwarding, etc. In some examples, at least some of the other devices in the network 100 may cease application level operations (such as for OADs), or prevent application level data requests from being provided to, or causing the router 104 to transmit data, based on a status reference other than normal of the router 104. In at least some examples, at least some of the other devices in the network 100 may take such action irrespective to a remaining portion of their respective bandwidth allocation (e.g., even if the respective other device(s) in the network 100 are not nearing exhaustion of their respective bandwidth allocation).

In at least some examples, the router 104 notifying the other devices in the network 100 of its status with respect to its bandwidth allocation may prevent other devices in the network 100 from interpreting a failure to receive a status message (or failure to receive a programmed consecutive number of status messages) from the router 104 as the router 104 being offline. Preventing erroneous interpretation of the router 104 as being offline may prevent unnecessary route discovery operations in the network 100 to route around the router 104, preventing or at least mitigating the presence of unnecessary network traffic in the network 100. For example, based on an expected time until, or of, replenishment of the bandwidth allocation of the router 104, at least some other devices in the network 100 may wait to initiate a network or route discovery operation in response to a lack of communication from the router 104 until after the expected time has passed.

As described above, status (or notification) messages may be transmitted between and among the devices of the network 100. For example, the router 104 may transmit a status message that includes link state information for their respective bandwidth allocation itself and at least some of its neighboring devices (e.g., at least some of the other devices in the network 100). However, the router 104 may be prohibited from transmitting the status messages if the router 104 has exhausted its bandwidth allocation. To prevent such an occurrence, the router 104 and at least some of the other devices in the network 100 may reserve, set aside, or otherwise allocate a portion of their respective bandwidth allocation for network maintenance messages. Network maintenance messages may include the status or notification message described above. Network maintenance messages may also include other messages that may be used in maintaining functionality of the network 100.

In at least some examples, network maintenance messages have a predetermined format and content (e.g., such as specified by standard, regulation, or other body) and may be transmitted at a known frequency. In this way, both a data size of the network maintenance messages and how many network maintenance messages are to be sent in a given time frame may be known a priori. Thus, a bandwidth requirement for sending the network maintenance messages in the given time frame may be determined and known a priori. The router 104 and at least some of the other devices in the network 100 may reserve a portion of their bandwidth allocation for a period of time sufficient for satisfying the bandwidth requirement for sending the network maintenance messages during that period of time and, in some examples, an additional buffer amount of bandwidth to provide protection against unexpected size increases in one or more of the network maintenance messages. By reserving portions of their respective bandwidth allocations for network maintenance messages, the router 104 and the other devices in the network 100 may protect against unnecessary network discovery operations, as described above, by maintaining network routes (e.g., transmission paths) intact in the network 100 via the network maintenance messages.

In at least some examples, the router 104 may also reserve a portion of its bandwidth allocation for other data. For example, the router 104, and sometimes at least some of the other devices in the network 100, may reserve a portion of their respective bandwidth allocations on demand or responsive to a request, such as a request to reserve bandwidth for transmission of time-sensitive data. In some other examples, the router 104, and sometimes at least some of the other devices in the network 100, may reserve a portion of their respective bandwidth allocations for transmission of time-sensitive data, such as if the existence of time-sensitive data is known a prior or to guard against the possibility of time-sensitive data later being received for transmission. For example, an end device 112 communicatively coupled to the router 104 may transmit a request to the router 104 to reserve bandwidth for transmitting time-sensitive data to be provided by the end device 112. The router 104 may reserve a portion of its bandwidth allocation for transmission of the time-sensitive data and then forward the request to the central node 102. Based on the request, the central node 102 may in turn reserve a portion of its bandwidth allocation for transmission of the time-sensitive data.

Similarly, an end device 112 communicatively coupled to the router 110 may transmit a request to the router 110 to reserve bandwidth for transmitting time-sensitive data to be provided by the end device 112. The router 110 may reserve a portion of its bandwidth allocation for transmission of the time-sensitive data and then forward the request to the router 108. Based on the request, the router 108 may in turn reserve a portion of its bandwidth allocation for transmission of the time-sensitive data and forward the request to the router 104 (or the router 106, depending on a programmed or saved routing path of the router 108). This may continue progressively through the network until each device in a transmission path beginning with the router 110 and ending with the central node 102 have reserved portions of their respective bandwidth allocations for transmission of the time-sensitive data. The router 104 and at least some of the other devices in the network 100 may also reserve an additional buffer amount of bandwidth to provide protection against unexpected size increases in the time-sensitive data for which bandwidth has been reserved. In at least some examples, a frame or packet including the time-sensitive data is identified by a flag in a header or control portion of the frame or packet. This may facilitate devices in the network 100 that receive and transmit the time-sensitive data counting the data size of the time-sensitive data against the portion of their respective bandwidth allocations reserved for transmission of the time-sensitive data. By reserving bandwidth for time-sensitive data, either as a default action responsive to replenishment of its bandwidth allocation or responsive to receiving a request to reserve bandwidth, the router 104 may improve operation of not only itself, but also the network 100 in general. For example, operation of the router 104 may be improved by preventing the router 104 from exhausting its bandwidth allocation prior to receipt of time-sensitive data (e.g., such that the router 104 would be incapable of forwarding the time-sensitive data due to the exhaustion). In addition, the router 104 reserving a portion of its bandwidth allocation for forwarding time-sensitive data received from other devices in the network 100 improves performance and operation of the network 100, for example, at least by preventing transmission of packets through the network being delayed (e.g., such as a delay of time-sensitive data).

Some data transmissions may be periodic or may be predictable according to some other pattern. In at least some examples, the router 104 may record and analyze its data transmission to identify data transmission patterns. For example, the router 104 may sub-divide units of time of the period of time for which the router 104 has a bandwidth allocation into small time slots. For example, one second of transmission time may be divided into 5 slots, 10 slots, 20 slots, or any other suitable number of slots. The router 104 may monitor or determine which slots, a number of consecutive slots, a number of slots in a group of slots, etc. in which the router 104 transmits data. The router 104 may perform the monitoring for several units of time to determine a data transmission pattern in which the router 104 transmits data. In some other examples, the router 104 may implement machine learning or other artificial intelligence processes to learn the data transmission pattern of the router 104 and/or predict or estimate a time at which the router 104 will exhaust its bandwidth allocation.

Based on the data transmission patterns, the router 104 may also determine an expected data transmission pattern describing data expected or predicted by the router 104 to be transmitted by the router 104 during a given period of time. Based on the expected data transmission pattern, the router 104 may take one or more actions. For example, the router 104 may decline to transmit certain data, such as if a size of that data, plus a total size of data according to the data transmission pattern for a given period of time exceeds the bandwidth allocation of the router 104. In another example, based on the expected data pattern the router 104 may notify one or more of the other devices in the network 100 of the expected data transmission pattern. Based on that notification, or responsive to receipt of that notification (e.g., caused by the notification), one of the other devices in the network 100 may select a next hop in a transmission route for data that either includes or avoids the router 104 based on the expected data transmission pattern of the router 104, can hold certain data for transmission at a later time based on the expected data transmission pattern of the router 104, etc.

In at least some examples, the notifications, status messages, network maintenance messages, or other communications of this disclosure may be implemented as an extension to a communication standard, specification, protocol, regulation, or other operating instructions according to which the router 104 operates. For example, at least some of the status messages or notifications may be provided in an Information Element of a data frame, data packet, header, control frame, or other data structure transmitted in the network 100. In another example, a new Information Element or other data field or structure may be added to a communication standard, specification, protocol, regulation, or other operating instructions according to which the router 104 operates to facilitate the notifications, status messages, network maintenance messages, or other communications of this disclosure. In some examples, at least some status or notification messages may be implemented as one-hop network layer command messages, where an example of a one-hop message is a message that is forwarded from a first device of the network 100 to a second device of the network 100, without being forwarded beyond the second device of the network 100. However, the second device of the network 100 may include a portion of information included in the network layer command message in another network layer command message that the second device of the network 100 transmits to a third device of the network 100.

While the above disclosure has focused description on operation of the router 104, the teachings of the present disclosure are applicable to other routers in the network 100, such as the router 106, the router 108, and/or the router 110. Additionally, at least some of the teachings of the present disclosure with respect to the router 104 are also applicable to the central node 102.

FIG. 2 is a flowchart of an example method 200. In at least some examples, the method 200 is a method for data prioritization in a network, such as the network 100 of FIG. 1. Accordingly, reference may be made to at least some components of FIG. 1 in describing FIG. 2. In some examples, the method 200 may be implemented at least in part by a router, such as the router 104, for example, to prioritize certain data for transmission in the network 100.

At operation 202, a bandwidth allocation of the router is replenished. In some examples, the router determines that its bandwidth allocation has been replenished based on expiration of a timer. The timer may be internally maintained by the router and may count down, beginning at a time at which the router's bandwidth allocation is replenished. In at least some examples, the router's bandwidth allocation may be replenished responsive to the down timer reaching zero. In other examples, the timer may be internally maintained by the router and may count up, beginning at a time at which the router's bandwidth allocation is replenished. In such an example, the router's bandwidth allocation may be replenished responsive to the timer reaching a programmed or predefined value representative of the period of time for which the bandwidth allocation is applicable. In other examples, the router determines that its bandwidth allocation has been replenished based on a particular time being reached, such as determined by the router according to a time or clock signal received by the router. For example, the router may determine that its bandwidth allocation has been replenished at the top of every hour, hourly on the half-hour, etc. In other examples, the router determines that its bandwidth allocation has been replenished based on a control or other signal received by the router that includes an indication that the router's bandwidth allocation has been replenished.

At operation 204, the router reserves a portion of its bandwidth allocation for the period of time for network maintenance messages. In this way, the router may prioritize transmission of network maintenance messages over transmission of other data, such as by reserving the portion of its bandwidth allocation for transmission of the network maintenance messages rather than for other data. In at least some examples, network maintenance messages have a predetermined format and content (e.g., such as specified by standard, regulation, or other body) and may be transmitted at a known or programmed (e.g., pre-programmed) frequency. In this way, both a data size of the network maintenance messages and how many network maintenance messages are to be sent in a given time frame (e.g., during a time period corresponding to the bandwidth allocation) may be known a priori. Thus, a bandwidth requirement for sending the network maintenance messages in the given time frame may be determined and known a priori. The router may reserve an amount of its bandwidth allocation for the period of time having a size approximately equal to the bandwidth requirement for sending the network maintenance messages. In some examples, the router may also reserve a buffer amount of the bandwidth allocation in addition to the bandwidth requirement for sending the network maintenance messages.

At operation 206, the router may transmit a network maintenance message. The network maintenance message may be transmitted to at least some other devices in the network. In some examples, the network maintenance message may be a link status message or other message for maintaining routing links in the network. In at least some examples, the network maintenance message includes information about an operation status about at least some other devices in the network. The network maintenance message may also include information about an operational status of the router, such as an amount of the bandwidth allocation of the router remaining, an amount of the bandwidth allocation of the router use, a time until expected replenishment of the router's bandwidth allocation, an expected time at which the router's bandwidth allocation will be replenished, a status reference of the router (e.g., such as normal, limited, critical, suspended, etc.), and/or any combinations thereof. The router may count a transmission size (e.g., data size, transmission time, etc.) of the network maintenance message against the portion of the bandwidth allocation of the router reserved by the router at operation 204 for network maintenance messages. In this way, the router may continue to transmit network maintenance messages even if the router has otherwise exhausted its bandwidth allocation, prioritizing the transmission of network maintenance messages over transmission of other data.

FIG. 3 is a flowchart of an example method 300. In at least some examples, the method 300 is a method for duty cycle reservation in a network, such as the network 100 of FIG. 1. Accordingly, reference may be made to at least some components of FIG. 1 in describing FIG. 3. In some examples, the method 300 may be implemented at least in part by a router, such as the router 104, for example, to reserve duty cycle for transmission of certain data in the network 100.

At operation 302, a request is received to reserve a portion of a bandwidth allocation of the router for transmission of time-sensitive data. In some examples, the request is received from an end device, such as the end device 112, from which the time-sensitive data may originate. In other examples, the request is received from a router, such as another of the routers 106-110, a central node, such as the central node 102, or is generated by the router 104 itself. In other examples, the request may be received from another device in the network, such as another router, a central node such as the central node 102, etc. The request may specify an amount of the bandwidth allocation of the router to reserve for the time-sensitive data, an expected size of the time-sensitive data, a buffer amount of the bandwidth allocation to reserve in addition to the expected size of the time-sensitive data, an expected time of transmission of the time-sensitive data (e.g., estimated time of receipt of the time-sensitive data by the router), a destination of the time-sensitive data, or some combination thereof.

At operation 304, the router may reserve a portion of its bandwidth allocation for the time-sensitive data. A size of the portion of the bandwidth allocation that is reserved may be determined according to information included in the request. In at least some examples, an additional amount of the bandwidth allocation may be reserved as a buffer in addition to the portion of the bandwidth allocation for the time-sensitive data.

In at least some examples, in addition to reserving the portion of the bandwidth allocation of the router, the router also forwards the request, or generates and transmits a new request including at least some information from the received request, to another device in the network. For example, the router may forward the request or transmit a new request to another router in the network that is along a transmission path or route of the critical data. In this way, portions of bandwidth allocations of each respective device in the network along the transmission path or route of the critical data may be reserved to facilitate transmission of the time-sensitive data. In this way, the router, and other devices in the network may continue to transmit network maintenance messages even if the router has otherwise exhausted its bandwidth allocation, prioritizing the transmission of network maintenance messages over transmission of other data.

At operation 306, the router may receive the time-sensitive data and transmit or forward the time-sensitive data to a next device in the network along a transmission path or route of the time-sensitive data through the network. The router may count a transmission size (e.g., data size, transmission time, etc.) of the time-sensitive data against the portion of the bandwidth allocation of the router reserved by the router at operation 304 for the time-sensitive data. In this way, the router may transmit the time-sensitive data even if the router has otherwise exhausted its bandwidth allocation for transmission of other data.

FIG. 4 is a flowchart of an example method 400. In at least some examples, the method 400 is a method for operation modification according to duty cycle limitations in a network, such as the network 100 of FIG. 1. Accordingly, reference may be made to at least some components of FIG. 1 in describing FIG. 4. In some examples, the method 400 may be implemented at least in part by a router, such as the router 104, for example, to mitigate data transmission by the router.

At operation 402, the router determines, during a period of time, a portion of a bandwidth allocation of the router for the period of time that has been consumed. In at least some examples, the consumed portion of the bandwidth allocation is expressed in terms of bandwidth allocation remaining. In other examples, the consumed portion of the bandwidth allocation is expressed in terms of bandwidth allocation used. The consumed portion of the bandwidth may also be expressed in relation to a threshold. For example, various thresholds may indicate various levels of consumed bandwidth allocation, such as normal, limited, critical, or suspended, as described above herein.

At operation 404, the router may transmit a message to a neighboring device in the network indicating the consumed bandwidth allocation of the router. In at least some examples, the message may indicate a potential, upcoming, or impending exhaustion of the bandwidth allocation of the router. The message indicating the consumed bandwidth allocation of the router may cause the neighboring device to modify its operation, irrespective of an amount of the bandwidth allocation of the neighboring device that has been consumed by the neighboring device. For example, based on the message indicating the consumed bandwidth of the router, the neighboring device may cease certain activities that may be high-bandwidth activities, such as performing OADs. In some examples, the neighboring device may cease the certain activities to reduce bandwidth consumption of the router. In other examples, the neighboring device may cease the certain activities to maintain an available amount of bandwidth allocation in the network to provide an alternate path through the network in the event that the router exhausts its bandwidth allocation.

Figure 5:
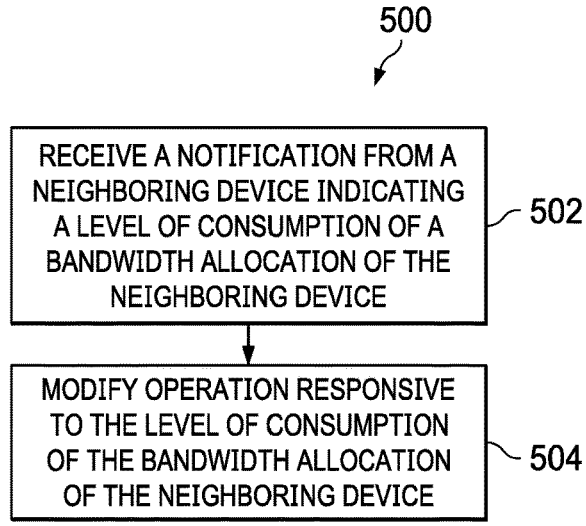
FIG. 5 shows a flowchart of an example method.

FIG. 5 is a flowchart of an example method 500. In at least some examples, the method 500 is a method for operation modification according to duty cycle limitations in a network, such as the network 100 of FIG. 1. Accordingly, reference may be made to at least some components of FIG. 1 in describing FIG. 5. In some examples, the method 500 may be implemented at least in part by a router, such as the router 104, for example, to mitigate data transmission by the router.

At operation 502, the router receives a notification from a neighboring device in the network indicating a level of consumption of a bandwidth allocation of the neighboring device in the network. In at least some examples, the level of consumption of the bandwidth allocation is expressed in terms of bandwidth allocation remaining. In other examples, the level of consumption of the bandwidth allocation is expressed in terms of bandwidth allocation used. The level of consumption of the bandwidth allocation may also be expressed in relation to a threshold. For example, various thresholds may indicate various levels of consumption of the bandwidth allocation, such as normal, limited, critical, or suspended, as described above herein.

At operation 504, the router may modify its operation responsive to the level of consumption of the bandwidth allocation of the neighboring device. In some examples, the router may cease certain activities of the router that cause the neighboring device to consume an additional amount of its bandwidth allocation. In other examples, the router may cease certain activities of the router that cause the router to consume an additional amount of its bandwidth allocation, such as to preserve available bandwidth for an alternative path through the network that may bypass the neighboring device.

Figure 6:
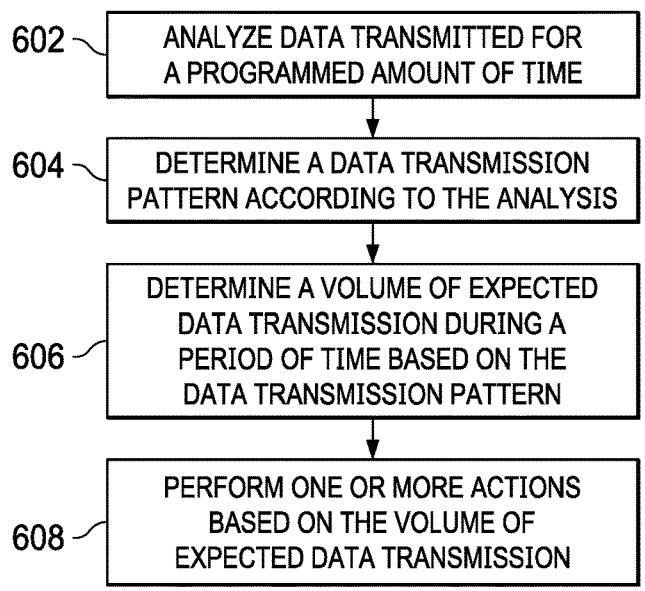
FIG. 6 shows a flowchart of an example method.

FIG. 6 is a flowchart of an example method 600. In at least some examples, the method 600 is a method for duty cycle usage prediction in a network, such as the network 100 of FIG. 1. Accordingly, reference may be made to at least some components of FIG. 1 in describing FIG. 6. In some examples, the method 600 may be implemented at least in part by a router, such as the router 104, for example, to predict duty cycle usage of the router.

At operation 602, the router analyzes data transmitted by the router for a programmed amount of time. For example, the router may maintain a record of data transmitted by the router (e.g., a historical transmission record) and may analyze a portion of the record corresponding to the programmed amount of time. In another example, the router may maintain a running total of data transmitted by the router for the programmed amount of time.

At operation 604, the router may determine a data transmission pattern of the router. The data transmission pattern may indicate an average amount of data transmitted by the router over the programmed amount of time, a distribution of data transmitted by the router across sub-portions of the programmed amount of time, etc.

At operation 606, the router may determine a volume of expected data transmission by the router during a period of time. The volume of expected data transmission may indicate an amount of data expected to be transmitted by the router during the period of time, a distribution of data to be transmitted by the router across sub-portions of the period of time, etc.

At operation 608, the router performs one or more actions based on the volume of expected data transmission. For example, the router may determine whether to transmit additional data based on a relationship between the volume of expected network data traffic for transmission during the period of time and a bandwidth allocation of the router for the period of time. For example, the router may decline to transmit data if transmitting the data would cause the router to exceed its bandwidth allocation for the period of time or may decline to transmit data if transmitting the data would cause the router to exceed a threshold amount of its bandwidth allocation for the period of time. In another example, the router may transmit information about the volume of expected network data traffic for transmission during the period of time to at least some neighboring devices in the network, such as for scheduling or planning of data transmission by those neighboring devices.

Figure 7:
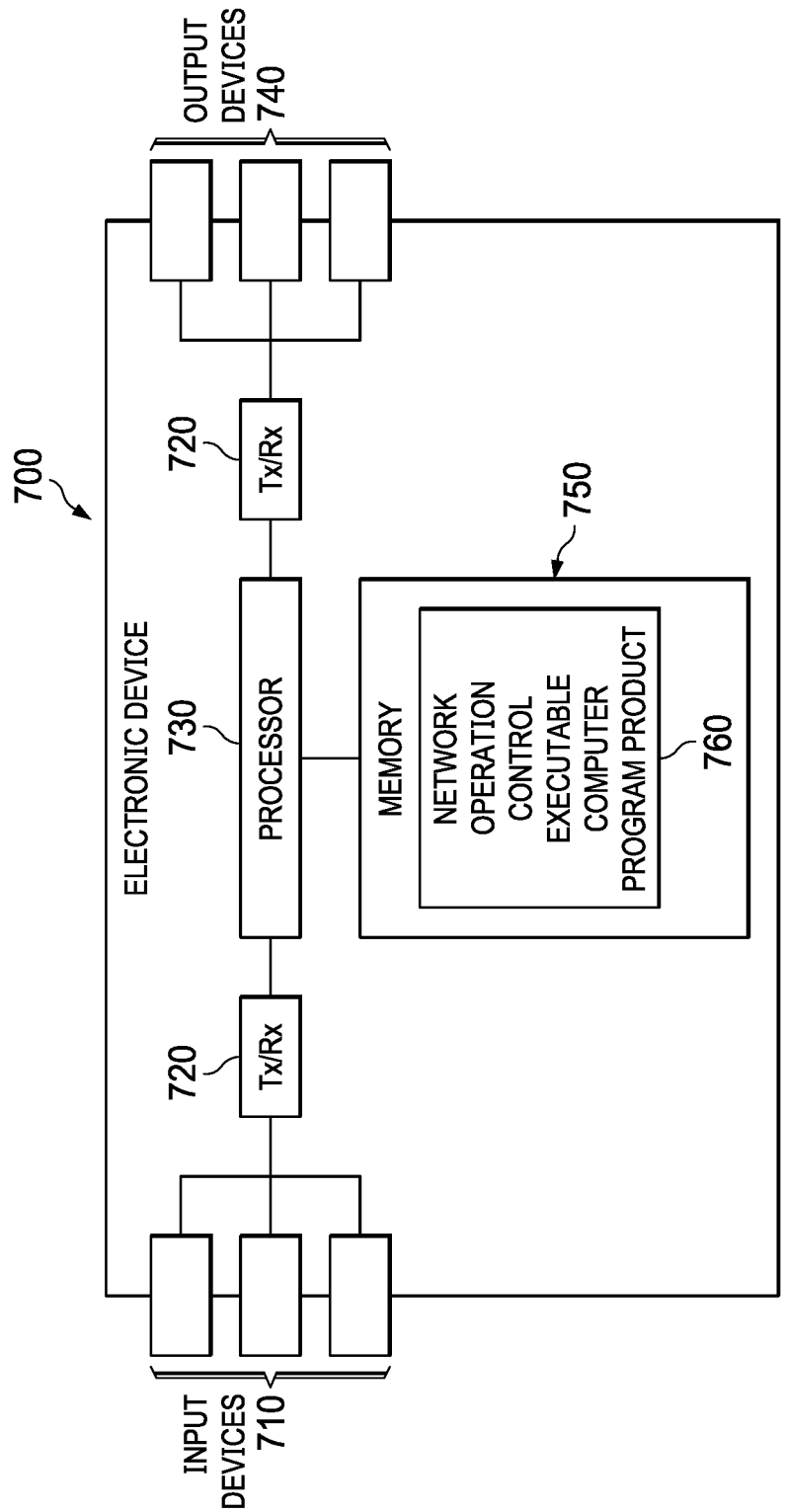
FIG. 7 shows a block diagram of an example electronic device.

FIG. 7 is a is a block diagram depicting an example of an electronic device 700. Electronic device 700 may be any suitable computing or processing device capable of performing the functions disclosed herein such as a computer system, a laptop (or similar) device, a tablet device, a smartphone, a personal computer, a server, an Internet of Things device, a cloud computing node, a router, and end device, a central node, etc. Electronic device 700 implements at least some of the features/methods disclosed herein, for example, as described above with respect to any of the central node 102, routers 104-110, method 200, method 300, method 400, method 500, and/or method 600.

The electronic device 700 comprises input devices 710. Some of the input devices 710 may be microphones, keyboards, touchscreens, buttons, toggle switches, cameras, sensors, and/or other devices that allow a user to interact with, and provide input to, the electronic device 700. Some other of the input devices 710 may be downstream ports coupled to a transceiver (Tx/Rx) 720, which are transmitters, receivers, or combinations thereof. The Tx/Rx 720 transmits and/or receives data to and/or from other computing devices via at least some of the input devices 710. Similarly, the electronic device 700 comprises a plurality of output devices 740. Some of the output devices 740 may be speakers, a display screen (which may also be an input device such as a touchscreen), lights, or any other device that allows a user to interact with, and receive output from, the electronic device 700. At least some of the output devices 740 may be upstream ports coupled to another Tx/Rx 720, wherein the Tx/Rx 720 transmits and/or receives data from other nodes via the upstream ports. The downstream ports and/or the upstream ports may include electrical and/or optical transmitting and/or receiving components. In another example, the electronic device 700 comprises antennas (not shown) coupled to the Tx/Rx 720. The Tx/Rx 720 transmits and/or receives data from other computing or storage devices wirelessly via the antennas. In yet other examples, the electronic device 700 may include additional Tx/Rx 720 such that the electronic device 700 has multiple networking or communication interfaces, for example, such that the electronic device 700 may communicate with a first device using a first communication interface (e.g., such as via the Internet) and may communicate with a second device using a second communication interface (e.g., such as another electronic device 700 without using the Internet).

A processor 730 is coupled to the Tx/Rx 720 and at least some of the input devices 710 and/or output devices 740 and implements the processes described herein, such as via a network operation control executable computer program product 760. In an example, the processor 730 comprises multi-core processors and/or memory modules 750, which functions as data stores, buffers, etc. The processor 730 is implemented as a general processor or as part of application specific integrated circuits (ASICs), field-programmable gate arrays (FPGAs), and/or digital signal processors (DSPs). Although illustrated as a single processor, the processor 730 is not so limited and may comprises multiple processors. In at least some examples, the processor 730 may be, or may be referred to as, a CPU. In at least some examples, the processor 730 may be referred to as a controller, or an embedded controller.

FIG. 7 also illustrates that a memory module 750 is coupled to the processor 730 and is a non-transitory medium to store various types of data. Memory module 750 comprises memory devices including secondary storage, read-only memory (ROM), and random-access memory (RAM). The secondary storage may comprise of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that may have a small memory capacity relative to the larger memory capacity of the secondary storage. The RAM is used to store volatile data and perhaps to store instructions. Access to both the ROM and RAM may be faster than to the secondary storage.

The memory module 750 may be used to house the instructions for carrying out the various examples described herein. For example, the memory module 750 may comprise the network operation control executable computer program product 760, which is executed by processor 730.

By programming and/or loading executable instructions onto the electronic device 700, at least one of the processor 730 and/or the memory module 750 are changed, transforming the electronic device 700 in part into a particular machine or apparatus, for example, a dock health monitoring device having the functionality taught by the present disclosure.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A non-transitory, computer-readable medium storing computer executable instructions, the instructions executable by a controller of a network device to cause the controller to:
   analyze data transmitted by the network device via a network for a programmed amount of time;
   determine a data transmission pattern based on the analysis;
   determine, based on the transmission pattern, a volume of expected data transmission during a period of time; and
   determine whether to transmit additional data based on a relationship between the volume of expected data transmission during the period of time and a bandwidth allocation of the network device during the period of time.

2. The computer-readable medium of claim 1, wherein the controller is configured to determine to transmit the additional data responsive to determining that a size of the additional data is less than a threshold amount of a difference between the bandwidth allocation of the network device during the period of time and the expected data transmission during the period of time.

3. The computer-readable medium of claim 1, wherein the controller is configured to determine not to transmit the additional data responsive to determining that a size of the additional data is greater than a threshold amount of a difference between the bandwidth allocation of the network device during the period of time and the expected data transmission during the period of time.

4. The computer-readable medium of claim 1, wherein the controller is configured to transmit a notification message to another device in the network, and wherein transmitting the notification message to another device in the network informs another device in the network of the volume of expected data transmission during the period of time.

5. A non-transitory, computer-readable medium storing computer executable instructions, the instructions executable by a controller of a network device to cause the controller to:
   determine a portion of a bandwidth allocation of the network device during a period of time consumed at a point in time within an instance of the period of time;
   responsive to the consumed portion of the bandwidth allocation being greater than a threshold amount, generate a status notification indicating the consumed portion of the bandwidth allocation; and
   transmit the status notification to a second network device,
   wherein the controller is configured to:
   decline to transmit application-level data responsive to determining that the consumed portion of the bandwidth allocation is greater than the threshold amount; and
   permit transmission of network maintenance data responsive to determining that the consumed portion of the bandwidth allocation is greater than the threshold amount, the network maintenance data useful for maintaining functionality of a network by which the network device and the second network device communicate.

6. The computer-readable medium of claim 5, wherein the status notification includes an amount of time until usage metrics for the bandwidth allocation reset.

7. The computer-readable medium of claim 5, wherein the controller is configured to:
   responsive to the consumed portion of the bandwidth allocation being less than the threshold amount, generate a status notification indicating the consumed portion of the bandwidth allocation; and
   transmit the status notification to the second network device.

8. The computer-readable medium of claim 5, wherein the controller is configured to reserve a portion of the bandwidth allocation for transmission of network maintenance messages of the network, the network maintenance messages having a predetermined data size and transmission frequency.

9. The computer-readable medium of claim 8, wherein the controller is configured to transmit a network maintenance message to the second network device irrespective of the consumed portion of the bandwidth allocation responsive to the portion of the bandwidth allocation reserved for transmission of network maintenance messages not being exhausted.

10. The computer-readable medium of claim 5, wherein the controller is configured to:
    receive second status notification from a third network device, the second status notification indicating a consumed portion of a bandwidth allocation of the third network device; and
    cease at least a portion of data transmission activities of the network device responsive to the consumed portion of the bandwidth allocation of the third network device irrespective of the consumed portion of the bandwidth allocation.

11. The computer-readable medium of claim 5, wherein the threshold amounts include a normal threshold, a limited threshold, a critical threshold, and a suspended threshold.

12. The computer-readable medium of claim 11, wherein the network device is prohibited from transmitting additional data for a remainder of the period of time responsive to the consumed portion of the bandwidth allocation exceeding the suspended threshold.

13. The computer-readable medium of claim 5, wherein the status notification causes the second network device to modify its operation responsive to the status notification indicating that the consumed portion of the bandwidth allocation is greater than the threshold amount.

14. The computer-readable medium of claim 5, wherein the controller is configured to inform the second network device of an expected time of replenishment of the bandwidth allocation to prevent the second network device from initiating a route discovery operation responsive to a lack of communication from the network device prior to the expected time of replenishment of the bandwidth allocation.

15. The computer-readable medium of claim 5, wherein the network maintenance data includes a link status message.

16. A non-transitory, computer-readable medium storing computer executable instructions, the instructions executable by a controller of a network device to cause the controller to:
   receive a request to reserve a portion of a bandwidth allocation of the network device for transmission of first network data;
   reserve the portion of the bandwidth allocation of the network device for transmission for first network data; and
   transmit, to a second network device based on the request to reserve the portion of the bandwidth allocation of the network device, a request to reserve a portion of a bandwidth allocation of the second network device.

17. The computer-readable medium of claim 16, wherein the controller is configured to:
   determine an expected transmission of data consuming a second portion of the bandwidth allocation of the network device;
   generate a request to reserve a second portion of the bandwidth allocation of the second network device, the second portion of the bandwidth allocation of the second network device having a size at least as large as the second portion of the bandwidth allocation of the network device; and
   transmit the request to reserve the second portion of the bandwidth allocation of the second network device to the second network device.

18. The computer-readable medium of claim 17, wherein the portion of the bandwidth allocation of the second network device and the second portion of the bandwidth allocation of the network device each include a buffer time.

19. The computer-readable medium of claim 16, wherein the first network data is time-sensitive network data, and wherein the controller is configured to:
   receive data including an indication that the received data is time-sensitive; and
   transmit the data to a next hop along a transmission route of the data irrespective of an amount of the bandwidth allocation remaining responsive to the data being indicated as time-sensitive data and the portion of the bandwidth allocation of the network device reserved for transmission of first network data not being exhausted.

20. The computer-readable medium of claim 16, wherein the controller is configured to:
   receive data not including an indication that the received data is time-sensitive; and
   decline to transmit the data to a next hop along a transmission route of the data responsive to the controller determining that transmitting the data would cause the network device to exceed a non-reserved portion of the bandwidth allocation of the network device, irrespective of the bandwidth allocation of the network device not yet being exhausted.

* * * * *